United States Patent [19]

Fournales

[11] 4,428,567
[45] Jan. 31, 1984

[54] COMBINED SHOCK ABSORBENT AND SUSPENSION FOR VEHICLE

[75] Inventor: Jean P. Fournales, Toulouse, France

[73] Assignee: Fournales France, Castanet Tolosan, France

[21] Appl. No.: 221,273

[22] Filed: Dec. 30, 1980

[30] Foreign Application Priority Data

Jan. 4, 1980 [FR] France ................................ 80 00345

[51] Int. Cl.³ .......................... F16F 9/348; F16F 9/36
[52] U.S. Cl. ................................ 267/64.26; 88/269; 188/282; 188/314; 188/317; 188/322.15; 188/322.17; 188/322.18; 88/322.21; 188/322.22; 267/64.28
[58] Field of Search ................ 188/322.13, 322.15, 188/322.16.322.17, 322.18, 322.19, 322.21, 322.22, 282, 314, 316, 317, 269; 267/64.28, 129, 127, 64.11, 64.26

[56] References Cited

U.S. PATENT DOCUMENTS

| | | | |
|---|---|---|---|
| 3,365,191 | 1/1968 | Ellis, Jr. et al. | 188/269 X |
| 3,633,966 | 1/1972 | Epple et al. | 188/317 X |
| 3,647,239 | 3/1972 | Katsumori | 267/64.11 |
| 3,788,433 | 1/1974 | Katsumori | 188/433 |
| 3,931,961 | 1/1976 | Fader et al. | 188/269 X |
| 3,993,294 | 11/1976 | Wasser et al. | 188/269 X |
| 4,030,715 | 6/1977 | Duran | 188/317 X |
| 4,166,523 | 9/1979 | Fujii et al. | 188/322.17 |
| 4,287,970 | 9/1981 | Eusemorn et al. | 188/269 |

FOREIGN PATENT DOCUMENTS

| | | | |
|---|---|---|---|
| 214725 | 4/1961 | | 267/64.11 |
| 1405886 | 12/1960 | Fed. Rep. of Germany. | |
| 1915102 | 3/1969 | Fed. Rep. of Germany. | |
| 1083751 | 1/1955 | France. | |
| 1156365 | 5/1958 | France. | |
| 1281906 | 1/1962 | France. | |
| 1291949 | 3/1962 | France. | |
| 1413974 | 9/1965 | France | 188/314 |
| 2044794 | 2/1971 | France. | |
| 2120129 | 8/1972 | France. | |
| 1010012 | 5/1963 | United Kingdom. | |
| 282944 | 12/1963 | U.S.S.R. | 188/269 |

Primary Examiner—George E. A. Halvosa
Attorney, Agent, or Firm—Sandler & Greenblum

[57] ABSTRACT

A combined shock absorber and suspension device, particularly for a vehicle, comprises a suspension whose function is to elastically support the weight of a vehicle and a double-effect shock absorber which comprises an energy dissipation brake. The combined shock absorber and suspension device is either oleopneumatic or hydropneumatic. The device includes two telescopically slidable tubes which are each blocked at one end and open at the other end, the respective open ends of the tubes adapted to be inserted into one another to achieve a telescopically slidable motion. Each of the tubes can comprise an oil reservoir, the two reservoirs being separated by a piston attached to a free end of the interior one of the tubes. The piston includes at least one permanently open bleed bore. This bore is adapted to work during both compression and expansion of the device. The piston also includes one or more flap valve bores which are adapted to open during compression and to close during extension or expansion of the device, and/or inversely, to provide necessary shock absorption characteristics. Compressed gaseous fluid is located only within the smaller diameter interior tube.

14 Claims, 10 Drawing Figures

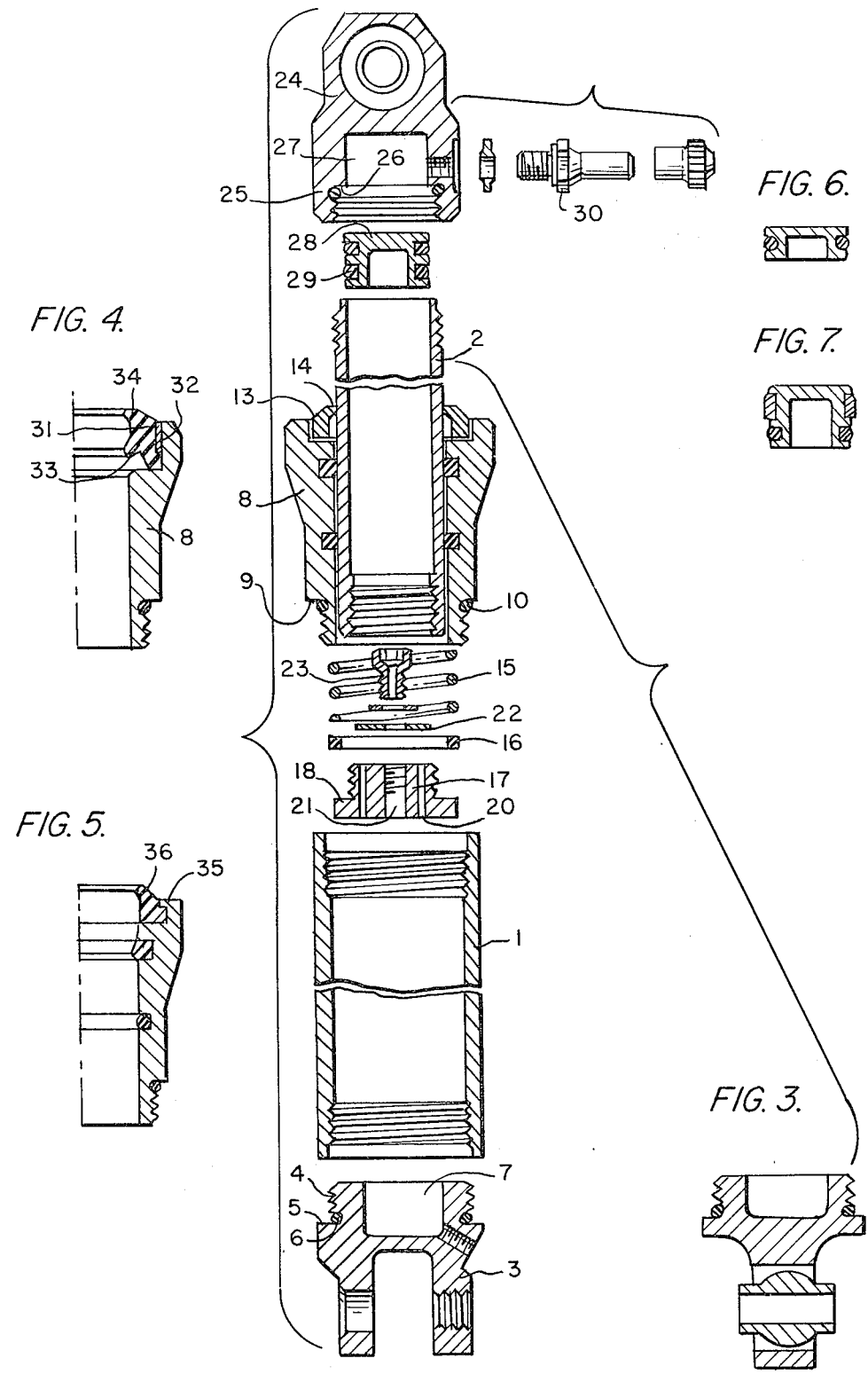

COMBINED SHOCK ABSORBENT AND SUSPENSION FOR VEHICLE

BACKGROUND OF THE INVENTION

1. Field of the Invention

The present invention relates to a combined apparatus comprising both a suspension whose function is to elastically support the weight of a vehicle and a double effect shock absorber, which may be considered to be an energy dissipater, the apparatus being of the oleopneumatic or hydropneumatic type.

2. Description of Prior Art

It has been known for several years to provide similar apparatus.

In the majority of cases the known devices comprise an oil shock absorber in the body of which a bleed piston is mounted at the end of a shaft fixed to the vehicle chassis.

The suspension function of these devices is generally fulfilled by a spring which surrounds the shaft and the shock absorber body.

During the penetration of the shaft into the piston body, because the volume of oil present is incompressible, it is therefore necessary to compensate for the resulting increase of volume caused by penetration of the shaft, this is generally obtained by the addition to the body of the piston a capacity or reservoir containing a compressible fluid, e.g. compressed air or gas.

It is likewise known to position the compressed gas reservoir laterally with respect to the shock absorber, the said reservoir being connected to the base of the cylinder of the shock absorber by a conduit having a system of valves.

Yet, the manufacture of devices having a lateral reservoir is costly.

The invention has as an aim overcoming the above inconveniences by providing a combined shock absorber and suspension which is of simple design which allows for a lower cost of manufacture than conventional devices and which facilitates maintenance.

The invention has as a further aim to provide an independent and compact combination which permits flexions at least equal to or greater in effect than conventional combinations of the same bulk.

To this end the combined apparatus according to the invention is either an oleopneumatic and/or hydropneumatic type comprising two tubes blocked, respectively, at one of their ends and sliding within one another, each of said tubes constituting an oil reservoir, the said reservoirs being separated by a piston fixed at the end of the interior one of the tubes and being provided with means allowing for the bleeding of oil during compression and/or relaxation, the compressed gaseous fluid being only situated in the interior smaller diamter tube such that the total of the capacity of the exterior one of the tubes is utilized in the expansion position as an oil reservoir.

According to another characteristic of the invention, the sliding interior smaller diameter tube is provided at its apex with a zone free of oil and fed with compressed gas such that in the compressed position of the device, the incompressible oil occupies the entire capacity of the interior tube except for said zone.

According to another characteristic of the invention, a threaded cap blocks each of the tubes and at leat one of the caps, which corresponds to the interal or interior sliding tube, is provided with an internal opening of a diameter smaller than the tube which constitutes the compressed air reservoir.

BRIEF DESCRIPTION OF THE DRAWINGS

Other advantages and characteristics of the invention will appear from a reading of following the description of an embodiment of the invention which is given by way of nonlimiting example and illustrated by the annexed drawings in which:

FIG. 3 is an exploded view of a combined device according to the invention;

FIGS. 4 and 5 are partial views of a ring with sealing elements connecting the two tubes which comprise the combined device;

FIGS. 6 and 7 are views of the floating piston; and

SUMMARY OF THE INVENTION

Figure 1:
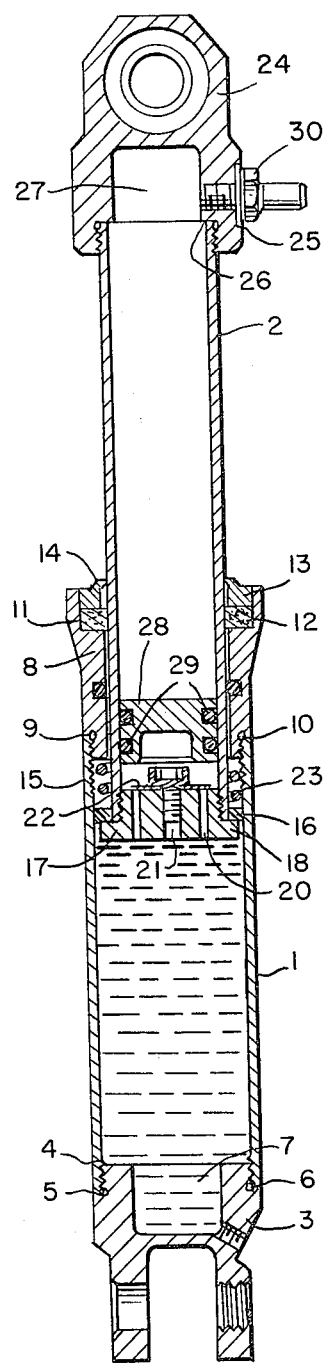
FIG. 1 is a view of the device according to the invention in an exterior, relaxed position.
Figure 2:
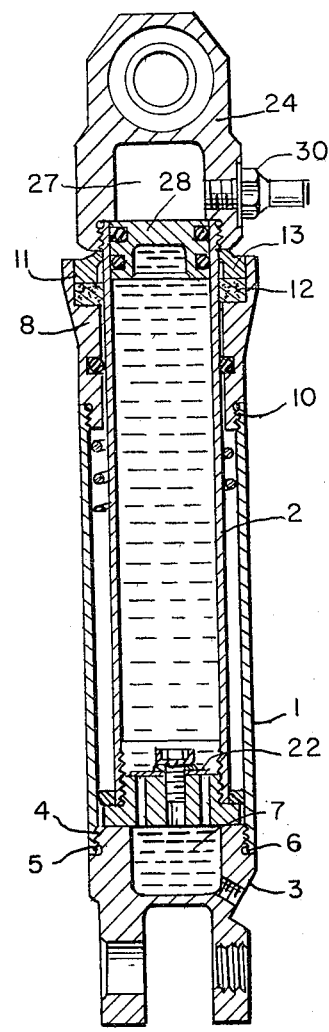
FIG. 2 is a view of the device according to the invention in an exterior position during compression.

As shown, the combined shock absorber and suspension device, according to the invention, comprises two tubes 1 and 2 slidably and telescopically connected.

The internal tube 2 has a smaller diameter than the external tube 1 and is mounted to slide therein.

The external tube 1 is blocked by a cap 3 provided with known means for attachment to a vehicle chassis and with a threaded orifice 3B having blocking means for filling the tube.

The cap 3 is provided with threading 4 which abuts shoulder 5 and lodging neck 6 of a sealing element, which comprises a torus joint.

Tube 1 is provided with an internal threading which cooperates with that of the cap 3.

Preferably, an annular groove is provided forwardly of the internal threading of the tube 1 for receiving a sealing joint and for preventing the joint from being crushed by the tube. This groove is located at a lower end of the tube.

The cap 3 is provided with an internal lodging area 7 which is formed by reaming or other process.

The upper end of the tube 1 is likewise provided with an internal threading adapted to cooperate with a threading corresponding to that of a ring 8 screwed into tube 1 and which cooperates with the internal tube 2 during the sliding thereof so as to assure its guidance. The ring has a shoulder 9 with lodging neck 10 forming part of a torus joint which similarly cooperates with an annular groove at the end of the tube 1 to prevent crushing of the joint. The ring 8 is provided with an internal recess or hollow 11 which receives a ring 12 made of a synthetic self-lubricating material which facilitates the sliding of the tube 2. Above the ring 12 a sealing ring 13 is force fit into the hollow 11. The ring includes a lip 14 which scrapes against the tube 2 which slides within the ring 12.

During assembly of the apparatus according to the invention, after insertion of tube 2 into the ring 8, a spring 15 is mounted which surrounds the tube 2 as is an elastic joint 16.

At the end of the tube 2 a piston 17 is screwed thereto. The piston cooperates with an internal threading of the tube so that piston blocking shoulder 18 rests against the tube.

The shoulder 18 has a diameter greater than that of the tube 2 and slightly less than that of the tube 1, for reasons which will be explained below, so that the piston 17 slides freely within the tube 1.

Piston 17 is provided with a plurality of transverse bores 20 and with a central threaded bore 21.

On the upper wall of the piston 17 is mounted a flap valve comprising a metallic element 22 in the form of a washer bored at its center and attached onto the piston by an Allen screw or other attachment means blocking the central bore of the elements. The element is threaded and bored with a transverse orifice 23 which is permanently open and which works both during compression and expansion of the device.

The upper end of tube 2 is provided with an external threading with a narrow portion at its apex which cooperates with internal threading of a cap 24. The cap is provided with means for attaching it to the chassis, the means comprising in conventional manner a swivel joint.

The cap 24 is provided at its upper level of the threading with an annular hollow 25 for receiving or lodging a sealing element, which element takes the form of a torus, and with a shoulder 26, above which is provided an opening 27.

In the tube 2 a free piston 28 is mounted which comprises a metallic ring whose cylindrical side is provided with one or two hollows receiving a torus sealing joint 29.

In FIGS. 6 and 7 other embodiments of the free piston 28 are illustrated.

In FIG. 6 the free piston 28 is provided with a single torus joint.

In FIG. 7 the free piston is provided with a lower sealing torus joint of the high pressure type and an upper joint having a rectangular cross section.

The upper cap 24 is provided with a compressed air feed means comprising a valve 30 attached transversely at its wall.

In FIGS. 4 and 5 partial views of different embodiments of the ring 8 are shown.

As shown in FIG. 4 the hollow 11 receives a monoblock scraper joint 31 of the high pressure type, with a metallic armature 32 provided with a lower lip 33 oriented downwardly and with an upper lip 34 oriented upwardly.

As shown in FIG. 5 the hollow 11 is provided with an internal annular shoulder 35 which allows for the attachment with a disassemblable scraper joint 36 of cross- section complementary to that of the hollow.

The hollow is also provided with an internal groove under the scraper joint 36 which receives a high pressure sealing joint and with a second substantially median internal groove which receives a torus joint.

During operation, the tubes 1 and 2 constitute two oil reservoirs and the lodging or receiving opening 27 of the cap 24, which is blocked during compression by the separator piston 28, constitutes a compressed air reservoir.

As a result there is no discontinuity of the liquid and gaseous fluids which fulfill their function without emulsion. The device is mountable and usable whether the cap 24 is positioned on top or below the device. In the extended position, of the device the free internal capacity of the tube 2 comprises an integral compressed air reservoir functioning as a suspension spring which makes it possible to absorb all of the forces relative to compression.

During compression of the liquid fluid in form of oil passes through the central bore of the tube which is permanently open, and raises the metallic element while creating a pressure across the other piston bores.

Because the cross-section of the piston is less than that of tube 1 the oil likewise passes into the space between the tubes 1 and 2.

At the end of the extension path, the spring 15 softens the movement by exercising a force in opposition to the force exerted by the fluids, compressed air and oil contained in the tubes.

Figure 8:
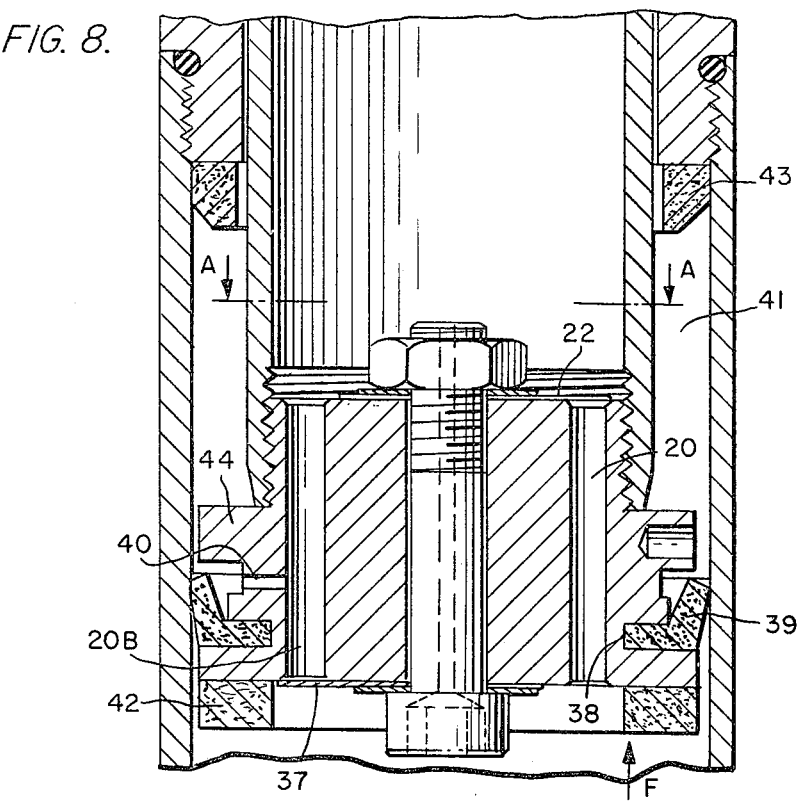
FIGS. 8, 9 and 10 are views of an alternative embodiment of the invention with respect to a piston with bleed elements.
Figure 9:
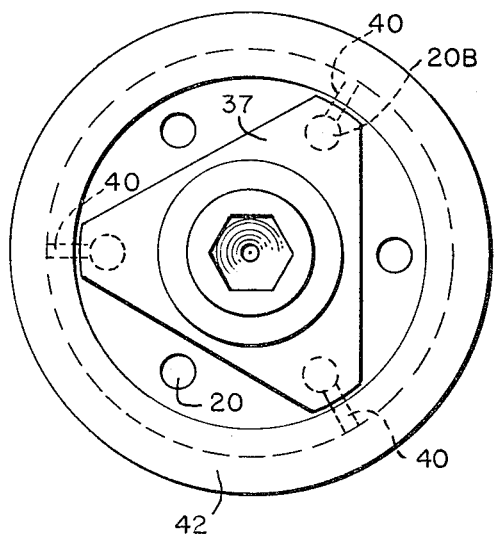
Figure 10:
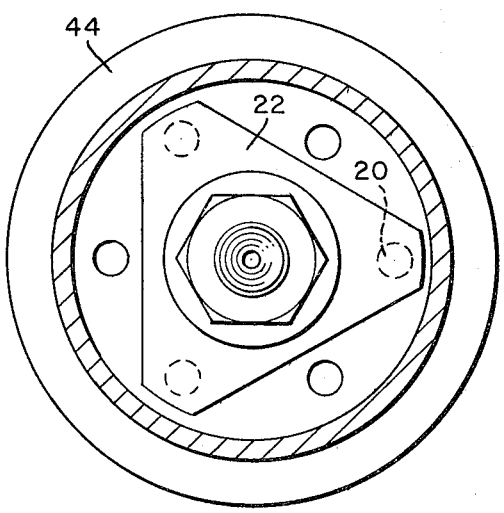

According to another embodiment of the invention, as shown in FIGS. 8, 9 and 10, the piston 17 with permanently open central bore 21 also be a plurality of transverse bores, preferably an even number thereof, e.g. six, which are radially provided with respect to the center of the piston.

A number of these bores 20, e.g. three, cooperate as explained above with a flap valve comprising metallic element 22, which is bored at its center and attached to the piston be an Allen screw bored with permanently open central orifice 23.

These bores 20 serve to bleed the oil during compression.

The other bores 20B cooperate with a flap valve comprising metallic element 37 attached to the underside of piston by an Allen screw or other means bored with an orifice along the axis permanently open central orifice 23 of the piston.

These bores 20B serve to bleed oil during expansion of the device.

The metallic elements 22 and 37 have a substantially equilateral triangular form whose apexes correspond to the bores which they must block (FIGS. 9 and 10).

The cylindrical wall of the piston, whose diameter is less than the internal diameter of the tube 1 in which it slides, is provided preferably above or on the cylindrical wall of the shoulder of a flexible and/or elastic element which is frictionally mounted on or positioned very close to the internal wall of the tubes, so that during compression this element serves to bleed oil which penetrates into the space provided between the tubes.

Preferably, as shown in the annexed drawings, in a peripheral hollow 38 of the piston wall, a scraper joint is mounted whose lip is oriented towards the capacity area provided between the tubes, and which rubs against the internal wall of the tube 1. The lip 39 is flexible and/or elastic. Bleeding element as described above can comprise conduits 40, which are provided in the body of the piston. The conduits place the bores 20B which are blocked by the lower flap valve 37 in communication with the volume 41 located between the tubes 1 and 2.

Under the piston an annular peripheral shoulder 42 is attached by known means which is adapted to soften the contact of the piston against the cap 3.

Under the ring 8, in the space 41, a peripheral annular shoulder 43 is mounted by any known means fulfills the same function during the extension of the device and during contact of the piston with the ring.

During compression of the device oil passes the lip 39 and bleeds itself between the said lip and the internal wall of the tube 1 while penetrating into the space 41, the lip 39 partially or totally blocking the conduits 40 by resting on an upper annular shoulder 44 of the piston provided above the conduits.

During extension the lip 39 again assumes its rubbing position and the oil contained in the space 41 passes through the conduit 40 into the bore 20B and is bled by the flap valve 37.

This arrangement of the invention makes it possible to bleed all of the oil contained in the device, and furthermore to eliminate the spring 15.

It will be appreciated that the manufacture and assembly of the device according to the invention is particularly simple and economical.

It is self evident that the tubes blocked by the caps as described could alternately be blocked by any other means, such as by tightening of their cylindrical walls towards their axes and that guidance of the sliding motion of the tubes, as achieved by means of the screwable ring, could be fulfilled by restraining or narrowing a portion of the wall of the tube 1 to diameter equal to the exterior diameter of tube 2.

It is self evident that the combination according to the invention can operate without the free piston, but if it does so operate, it must be held in the position shown in the drawings.

The device according to the invention can use accessories and alternatives within the domain of technical equivalence without going beyond the scope of the present patent. /

What is claimed is:

1. A combination shock absorber and suspension device for a vehicle comprising:
    (a) a first, exterior tube having a closed lower end and an open upper end;
    (b) a second, interior tube having a closed upper end and an open lower end and being telescopically positioned within the upper end of said exterior tube;
    (c) a first piston being rigidly connected to the lower end of said interior tube, said interior and exterior tubes being axially spaced apart from one another and thereby forming a first, annular chamber for retaining pressurized fluid, said first chamber comprising the space between said tubes and having a lower end bounded by said piston, a second chamber for retaining said pressurized fluid being located within said exterior tube below said piston, a third chamber for retaining said pressurized fluid being located within said interior tube and adjacent to said lower end of said interior tube, and above said piston, said piston comprising a central axial bore providing a permanent fluidic connection between said second and said third chambers, said piston further comprising at least one first flap valve orifice for conducting fluid from said second chamber to said third chamber during compression of said shock absorber and at least one second flap valve orifice for conducting fluid from said third chamber to said second chamber during extension of said shock absorber, wherein fluid is adapted to be retained within said chambers and to be communicated between said chambers during relative displacement of said interior tube and said exterior tube, and wherein fluid is adapted to reside between said piston and said exterior tube;
    (d) a closing ring attached to the upper end of said exterior tube, said interior tube and said piston being slidably retained within an opening in said ring, said ring being adapted to guide longitudinal movement of said piston and said interior tube and said piston thereby being movable within said exterior tube so as to change the relative size of said second and third chambers, said piston and said inner surface of said exterior tube being spaced apart from one another in non-abutting relationship and said ring and said interior tube defining the upper end of said first chamber; and
    (e) a flexible lip adapted to contact said exterior tube and which is adapted to permit fluid to be conducted along the periphery of said piston and from said second chamber into said first chamber during compression of said shock absorber, and wherein said piston has at least one radial orifice positioned above said lip and which is adapted to permit fluidic communication between said first chamber and said third chamber via said second flap valve orifice.

2. A combined shock absorber and suspension device in accordance with claim 1 wherein said piston includes a recess and a flexible and elastic lip is positioned within said recess, said lip being adapted to contact the inner surface of said exterior tube and being upwardly oriented towards said annular chamber, said lip being movable to permit fluid to be communicated from said second chamber to said first chamber during compression of said shock absorber and to prevent such fluid communication during extension of said shock absorber.

3. A combination shock absorber and suspension device in accordance with claim 1 further comprising means for regulating fluid communication, said means including said central bore in a permanently open condition to continuously fluidically connect said second and third chambers.

4. A combination shock absorber and suspension device in accordance with claim 1 further comprising an air feed valve at the upper end of said interior tube and a fluid feed valve at the lower end of said exterior tube.

5. A combination shock absorber and suspension device in accordance with claim 1 further comprising a compression element positioned within said second chamber and adapted to soften the contact between the piston and said closing ring at the upper end of said exterior tube during extension of said shock absorber.

6. A combination shock absorber and suspension device in accordance with claim 1 wherein said chambers are adapted to retain and communicate oil, water, or a combination thereof.

7. A combination shock absorber and suspension device in accordance with claim 1 further comprising means for selectively preventing fluid flow between said chambers, said flow preventing means comprising at least one flap valve selectively preventing fluidic communication between said second and third chambers.

8. A combination shock absorber and suspension device in accordance with claim 1 further comprising a second piston adapted to freely move within said interior tube during compression and extension of said device.

9. A combination shock absorber and suspension device in accordance with claim 8 wherein said free piston includes a single torus joint.

10. A combination shock absorber and suspension device in accordance with claim 8 wherein said free piston includes a lower sealing torus joint and an upper high-pressure joint having a rectangular cross-section, and means including said second piston to compress gas in said exterior tube above said second piston.

11. A combination shock absorber and suspension device in accordance with claim 1 wherein said ring includes a recess which receives a synthetic self-lubricating ring adapted to facilitate sliding of the interior tube within said ring.

12. A combination shock absorber and suspension device in accordance with claim 11 further comprising a scraper joint and a metallic armature having a downwardly oriented lower lip and an upwardly oriented upper lip.

13. A combination shock absorber and suspension device in accordance with claim 11 wherein said ring recess comprises an internal annular shoulder and a scraper joint having a cross-section complementary to the cross-section of said recess and attached thereto.

14. A combination shock absorber and suspension device in accordance with claim 1 wherein said third chamber comprises a major portion of said interior tube.

* * * * *

UNITED STATES PATENT AND TRADEMARK OFFICE
CERTIFICATE OF CORRECTION

PATENT NO. : 4,428,567

DATED : January 31, 1984

INVENTOR(S) : Jean P. FOURNALES

It is certified that error appears in the above-identified patent and that said Letters Patent is hereby corrected as shown below:

On the cover page, in the Title, delete "absorbent" and insert ---absorber---

On the cover page, in the U.S. Classification, delete "267/6426" and insert ---267/064.026---

On the cover page, in the U.S. Patent Documents, delete "Wasser" and substitute ---WOSSNER---

On the cover page, in the U.S. Patent Documents, delete "Eusemorn" and substitute ---EUSEMANN---

On the cover page, in the Foreign Patent Documents, add ---Austria--- after "4/1961.

On the cover page, in the Abstract, lines 19 & 20, delete "and-/or" and substitute ---and/or---

In column 1, line 27, add ---;--- after "shaft".

In column 1, line 29, add ---,--- after "e.g.".

In column 1, line 41, add ---,--- after "devices".

In column 1, line 55, add ---,--- after "interior".

In column 1, line 55, delete "diamter" and substitute ---diameter---

UNITED STATES PATENT AND TRADEMARK OFFICE
CERTIFICATE OF CORRECTION

PATENT NO. : 4,428,567

DATED : January 31, 1984

INVENTOR(S) : Jean P. FOURNALES

It is certified that error appears in the above-identified patent and that said Letters Patent is hereby corrected as shown below:

In column 1, line 60, add ---,--- after "sliding".

In column 1, line 66, delete "leat" and substitute ---least---

In column 1, line 67, delete "interal" and substitute ---internal---

In column 2, line 65, insert ---,--- after "tube 2".

In column 3, line 26, insert ---joint--- after "torus".

In column 3, line 51, delete "of" and substitute ---with a---

In column 3, line 65, insert ---of--- after "top".

In column 3, line 66, delete "," after "position".

In column 3, line 66, insert ---,--- after "device".

In column 4, line 3, delete "of the" after "compression".

In column 4, line 3, insert ---the--- after "in".

In column 4, line 4, insert ---,--- after "tube".

UNITED STATES PATENT AND TRADEMARK OFFICE
CERTIFICATE OF CORRECTION

PATENT NO. : 4,428,567
DATED : January 31, 1984
INVENTOR(S) : Jean P. FOURNALES

It is certified that error appears in the above-identified patent and that said Letters Patent is hereby corrected as shown below:

In column 4, line 16, delete "be" and substitute ---has---

In column 4, line 18, insert ---,--- after "e.g.".

In column 4, line 20, insert ---,--- after "e.g.".

In column 4, line 23, delete "be" and substitute ---by---

In column 4, line 47, delete "capacity".

In column 4, line 50, change "element" to ---elements---

In column 4, line 51, delete ",".

In column 4, line 60, after "means", insert ---and---

In column 5, line 17, after "to" (first occurence), insert ---a---

In column 5, line 26, delete "/".

Signed and Sealed this

Eleventh Day of December 1984

[SEAL]

Attest:

GERALD J. MOSSINGHOFF

Attesting Officer    Commissioner of Patents and Trademarks